(12) United States Patent     (10) Patent No.: US 8,096,010 B2
Richeux et al.                 (45) Date of Patent:     Jan. 17, 2012

(54) BRIDGE SPAN AND BRIDGE SPAN TRANSPORTATION VEHICLE

(75) Inventors: Elisabeth Richeux, La Ciotat (FR); Henri Aubert, Sanary (FR)

(73) Assignee: Constructions Industrielles de la Mediterranee—CNIM, Paris (FR)

( * ) Notice: Subject to any disclaimer, the term of this patent is extended or adjusted under 35 U.S.C. 154(b) by 743 days.

(21) Appl. No.: 11/996,324

(22) PCT Filed: Jul. 26, 2006

(86) PCT No.: PCT/FR2006/001825
§ 371 (c)(1),
(2), (4) Date: May 22, 2008

(87) PCT Pub. No.: WO2007/012757
PCT Pub. Date: Feb. 1, 2007

(65) Prior Publication Data
US 2009/0106917 A1    Apr. 30, 2009

(30) Foreign Application Priority Data
Jul. 27, 2005 (FR) ..................... 05 08017

(51) Int. Cl.
*E01D 15/127* (2006.01)
(52) U.S. Cl. ............... 14/2.5; 14/2.4; 14/2.6
(58) Field of Classification Search ........ 14/2.4, 14/2.5, 2.6
See application file for complete search history.

(56) References Cited

U.S. PATENT DOCUMENTS

| | | | | |
|---|---|---|---|---|
| 3,010,128 A * | 11/1961 | Gillois et al. | ..................... | 14/2.6 |
| 3,021,544 A * | 2/1962 | Gehlen et al. | ..................... | 14/27 |
| 3,562,829 A | 2/1971 | Söffge | | |
| 3,628,490 A * | 12/1971 | Gehlen | ........................... | 14/2.6 |
| 3,820,181 A * | 6/1974 | Wagner | ........................... | 14/2.5 |
| 3,837,027 A * | 9/1974 | Gehlen | ........................... | 14/2.6 |
| 4,621,385 A * | 11/1986 | Gillois | ........................... | 14/2.4 |
| 5,363,527 A * | 11/1994 | Rainaud et al. | ................. | 14/2.4 |
| 5,862,556 A | 1/1999 | Aubert | | |
| 5,862,557 A | 1/1999 | Aubert | | |
| 5,937,468 A * | 8/1999 | Wiedeck et al. | ................. | 14/2.5 |
| 6,611,982 B2 * | 9/2003 | Eberl et al. | ....................... | 14/2.5 |
| 6,722,931 B2 * | 4/2004 | Eberl | ........................... | 440/12.5 |
| 7,543,347 B2 * | 6/2009 | Green | ........................... | 14/2.4 |
| 7,690,957 B2 * | 4/2010 | Richeux et al. | ............. | 440/12.5 |
| 2008/0189884 A1 * | 8/2008 | Wiedeck et al. | ................. | 14/2.5 |

FOREIGN PATENT DOCUMENTS

| | | |
|---|---|---|
| EP | 0 475 853 A1 | 3/1992 |
| FR | 1.340.803 | 10/1963 |
| FR | 1.595.119 | 6/1970 |
| FR | 2.175.710 | 10/1973 |

* cited by examiner

*Primary Examiner* — Gary S Hartmann
(74) *Attorney, Agent, or Firm* — Leydig, Voit & Mayer, Ltd.

(57) ABSTRACT

A system for transporting a span on a road vehicle capable of being transformed into an amphibious vehicle, enabling crossing of a dry or water-filled gap by any road vehicle. The vehicle for transporting the span is amphibious to allow any vehicle to cross a gap filled with water by transferring and transporting the vehicle on the span supported on the amphibious vehicle operating as a floating ferry. The invention is particularly applicable in the field of civil or military engineering.

20 Claims, 8 Drawing Sheets

BRIDGE SPAN AND BRIDGE SPAN TRANSPORTATION VEHICLE

FIELD OF THE INVENTION

The present invention relates to a system for transport of at least one span by a road vehicle and for laying the span from the vehicle over a dry gap in order to enable any road vehicle to cross the dry gap by driving over the span laid over this gap.

BACKGROUND

Such systems are known, for example, from French Patent No. 2 666 772 and French Patent No. 2 683 837 in the name of the applicant.

However, these known systems are not suitable for crossing wet gaps, that is to say gaps filled with water, whose width is such that the span cannot cover them.

Also known is the use of modular floating bridges which can be put end-to-end in order to cover all widths of wet gaps and enable them to be crossed by any road vehicle. However, these floating bridges cannot be used for crossing dry gaps.

SUMMARY OF THE INVENTION

The present invention aims to eliminate the disadvantages above by proposing a system for transport of at least one span by an amphibious road vehicle so that it is used either for laying the span over a dry gap, or as a floating ferry or bridge for crossing a wet gap regardless of the width of the latter.

To this effect, according to the invention, the system for transport of at least one span by a road vehicle and for laying the span from the vehicle over a dry gap in order to enable any road vehicle to cross the gap is characterized by the fact that the vehicle for transporting the span is amphibious in order to enable any road vehicle to cross a gap filled with water by transferring and transporting this vehicle on the span resting on the amphibious vehicle functioning as a floating ferry.

The amphibious vehicle is preferably provided with one or more inflatable lateral ballasts, of the tubular type, making it possible to increase the floatability and stability of the amphibious vehicle.

The suspensions, hydraulic in particular, of the amphibious vehicle can be operated so as to raise the axles of the vehicle which has a turbine device for its aquatic propulsion.

The span extends longitudinally with respect to the transport vehicle and comprises two twinned parallel, roughly parallelepiped boxes defining two upper tracks and two ramps for access to the tracks, which are respectively articulated to the two ends of the boxes around a transverse pin, and a means is provided so as to make possible the pivoting of each ramp from an inactive position folded over the corresponding box to an active deployed position in extension of the box in which the access ramp is maintained when the span is used for crossing a dry gap or in which the access ramp can be adjusted to a determined angular position on either side of its position in extension of the box when the vehicle is used as floating ferry in such a way as to adapt the ramp to the profile of the bank of the gap filled with water when the ramp must rest on this bank for the transfer of any vehicle from the bank onto the span or the transfer of the vehicle from the span onto the bank.

Preferably, the means for pivoting of each access ramp comprises an actuating cylinder mounted in the corresponding box of the span and two connecting rods having two of their ends articulated together at the end of the rod of the cylinder and their opposite ends articulated respectively to the inner surface of the upper track wall of the parallelepiped box and to the inner surface of the lower wall of the box of the ramp.

The span of the vehicle functioning as floating ferry can be connected end-to-end in a removable manner by a connecting means to another identical span of another vehicle functioning as floating ferry in order to form a longer floating bridge.

The connecting means makes it possible to connect end-to-end the ends of the two deployed access ramps of a given end of the span of the amphibious vehicle respectively to the ends of the two deployed access ramps of a given end of the span of the other amphibious vehicle.

The connecting means comprises an articulating hinge of which the knuckles of the ends of one of the access ramps engage respectively in conjugate recesses of the end of the other opposite access ramp, a pin passing through the recesses and the knuckles so as to assemble the ends of the ramps together, and sets of connecting rods arranged on each side of the ramps put end-to-end, including a central connecting rod connected to a corresponding end of the pin while extending below the ramps and two lateral connecting rods connected, on one hand, to the end of the central connecting rod on the opposite side from the pin, and on the other hand, respectively to the corresponding sides of the ramps.

According to an embodiment variant, the connecting means makes it possible to connect end-to-end the ends of two access ramps of a given end of the span of the amphibious vehicle and occupying their position folded over the span respectively to the ends of the two access ramps of a given end of the span of the other amphibious vehicle and also occupying their position folded over this span.

According to yet another embodiment variant, the connecting means makes it possible to connect, by overlapping, the ends of the two deployed access ramps of a given end of the span of the amphibious vehicle to the ends of the two deployed access ramps of a given end of the span of the other amphibious vehicle.

Advantageously, the two ramps of a given end of the span are provided with a plate arranged between the two ramps and whose free end is raised in the manner of a ski.

For laying the span over a dry gap, the system has a beam for support and launching of the span arranged approximately in the longitudinal axis of the vehicle, which can be moved relative to the vehicle according to this axis between an inactive position resting on the vehicle and a launching position projecting with respect to the vehicle in which the span is moved by translation guided on the launching beam also to a position projecting with respect to the launching beam which is supported by an underframe which can be oriented, while being able to translate in a guided manner on it, the underframe tilting around a fixed horizontal pin in order to enable the beam to pivot to the point that the span comes to rest first by its projecting end on the edge of the gap on the opposite side from that situated on the vehicle side, and then by its opposite end on the edge of the gap on the vehicle side, the launching beam then being disengaged from the span which is laid over the gap.

The system advantageously has at least one thrust cylinder situated at the rear of the vehicle under the beam and of which the body is attached to the chassis of the vehicle and the rod rests in a sliding manner under the beam, with it possible for the cylinder to be operated so as to make the beam tilt downward around the pivot pin of the titling underframe so as also to bring the end of the span to rest on the corresponding edge of the gap to be crossed.

The system also has a means for fastening of the beam to the chassis of the vehicle that comprises a rigid frame connected perpendicularly to the chassis and two jaws mounted articulated to the frame and controlled by a cylinder mounted on the frame in such a way that each jaw can squeeze a corresponding lower part of the beam.

The system can be transported by airplane.

The vehicle in its front has a stabilization foot which can come to rest on the ground during laying of the span over the dry gap and during which the vehicle rests on its axles.

The invention also relates to a process for transfer and transport of a vehicle on a span borne by an amphibious vehicle for crossing a gap filled with water and using the system as described in the preceding, and includes bringing the amphibious vehicle close to one of the banks of the gap, deploying the inflatable lateral ballasts of the amphibious vehicle, deploying the end ramps of the span in horizontal position in the extension of the two boxes of the latter, operating the hydraulic suspensions of the amphibious vehicle in order to raise its axles, orienting the two ramps of a given end of the span relative to the two boxes in order to bring them to rest on the bank of the gap where the vehicle to be brought on board is situated, bringing the vehicle on board the span in such a way that it is situated roughly in the middle of the span, raising the two ramps to their horizontal position, moving the amphibious vehicle towards the opposite bank, orienting the two ramps of the other end of the span relative to the two boxes in order to bring them to rest on the opposite bank of the gap, landing the transported vehicle on the opposite bank and of raising the two ramps to their horizontal position.

BRIEF DESCRIPTION OF DRAWING FIGURES

The invention will be better understood and other aims, characteristics, details and advantages of it will appear more clearly in the following explanatory description in reference to the appended diagrammatic drawings given only by way of example, illustrating an embodiment of the invention and in which:

FIG. 8 is a view in perspective of a set consisting of a beam for support and launching of a span and an underframe for tilting of this beam;

FIG. 9 is a view in perspective representing the span of the amphibious vehicle of FIG. 1 in deployed position;

DETAILED DESCRIPTION

In reference to FIGS. 1 to 15, reference 1 designates a road vehicle, such as a truck, enabling one to transport span 2 towards a gap that needs to be crossed by vehicles VT, for example, military vehicles.

Vehicle 1 has armored cab 3 extended in the rear by longitudinal chassis 4 which supports the system for laying span 2 over gap B.

This system has beam 5 for support and launching of span 2 arranged in resting position on chassis 4 of the vehicle in its longitudinal axis and which can be moved relative to the vehicle according to this axis between its inactive position resting on the vehicle and a launching position projecting with respect to the vehicle.

Beam 5 is made up of a strong structure with an I-shaped cross section and is mounted on an underframe in the form of girder 6 which can tilt around fixed horizontal pin 7 relative to the chassis of vehicle 1 in order to make possible the tilting of the beam from its horizontal position projecting with respect to the vehicle downward during laying of span 2.

The tilting of underframe 6 around pin 7 is controlled by two lateral hydraulic jacks 8, body 9 of each cylinder 8 being attached in an articulated manner to the chassis of the vehicle and rod 10 of the cylinder being connected in an articulated manner to tilting underframe 6 to the rear of the latter.

Beam 5 can move by translation along tilting underframe 6, and for this purpose, beam 5 can be connected to tilting underframe 6 by a dove tail connection.

Although it is not represented, the means for moving beam 5 by translation relative to tilting underframe 6 can include an electric or hydraulic motor attached under the tilting underframe, a rack attached longitudinally under the launching beam and a drive gear driven by the rotating shaft of the motor, engaged with the rack.

Span 2 has a driving structure consisting of two twinned parallel, roughly parallelepiped boxes 11 defining two upper tracks and two access ramps 12, each consisting of a box and articulated respectively at the two ends of a given side of the two boxes 11 of the driving structure around transverse hinge pin 13. Each ramp 12 has a slope which enables any vehicle to access the tracks of boxes 11 and to leave them easily.

Span 2 moreover has a set of rollers 14 and connecting arms 15 for boxes 11, arranged transversely between boxes 11 and which make possible the positioning of span 2 on launching beam 5 and facilitate the translation of span 2 with respect to this beam. Connecting arms 15 and end rollers 14 also make it possible to retrieve and lay down span 2.

Rollers 14 of connecting arms 15 can slide in guide rails 16 of launching beam 5, and although it is not represented, the means for translating span 2 on launching beam 5 comprises an electric or hydraulic motor connected to beam 5 and a rack connected with the span, on which a drive gear engages, which is driven by the rotating shaft of the electric or hydraulic motor.

The system for laying a span over a gap and for retrieving it as described in the preceding corresponds to the system described in particular in French Patent No. 2 666 772 in the name of the applicant, and it is sufficient to refer to this patent in order to understand the details of its structure and functioning.

According to the invention, vehicle 1 is amphibious so as to enable any other road vehicle VT to cross a very wide gap filled with water as will be seen later on.

The suspensions of amphibious vehicle 1 can be operated, for example, by the driver of the vehicle, in such a way as to raise axles 17 of the vehicle which is moreover provided with an aquatic propulsion device, for example, a turbine or pump-jet device 18, which is known in itself.

Amphibious vehicle 1 is also provided with one or more inflatable lateral ballasts 19, of the tubular type, which increase the floatability and stability of the amphibious vehicle. As emerges more clearly from FIG. 5, two lateral inflatable tubes 19 are provided on each side of the vehicle arranged under a chassis part forming lateral wing 20 of the vehicle.

Vehicle 1 moreover has a device for deployment of the ramps by tilting around their respective hinge pins 13 from their transport or driving position in which ramps 12 occupy a position folded over the driving structure with boxes 11 with the track of each ramp resting on the corresponding track of the box.

Figure 7:
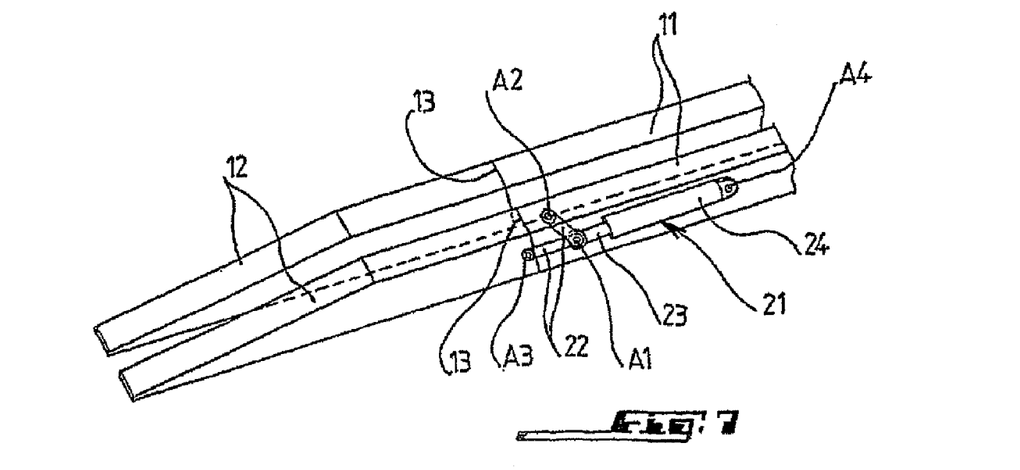
FIG. 7 is a partial view in perspective of the span showing the means making possible the pivoting of each access ramp relative to the span.

Preferably, this deployment device includes actuating cylinder 21 mounted in each box 11 of span 2 and two connecting rods 22 having two of their ends articulated together at A1 at the end of rod 23 of cylinder 21 and their opposite ends articulated respectively at A2 and A3 to the inner surface of the upper wall forming the track of box 11 and to the inner surface of the lower wall of the box of ramp 12. The end part opposite rod 23 of cylindrical body 24 of each cylinder 21 is connected in an articulated manner at A4 to the corresponding box 11 of span 2.

Of course, the four jacks 21 associated respectively with the four ramps 12 can be operated simultaneously or separately in pairs in order to make possible the pivoting of each ramp 12 from its inactive position folded over the corresponding box 11 to an active deployed position in extension of the box in which access ramp 12 is maintained when span 2 is used for crossing a dry gap or in which ramp 12 can be adjusted to a determined angular position on either side of its position in extension of box 11 when the vehicle is used as floating ferry in such a way as to adapt ramp 12 to the profile of the bank of the gap filled with water when the ramp has to rest on this bank for the transfer of any vehicle from the bank onto span 2 or the transfer of the vehicle from span 2 onto the bank. For this purpose, each cylinder 21 and its two connecting rods 22 make it possible for each access ramp 12 to perform rotations of 200° of angle around pivot pin 13 so that in a floating ferry or bridge mode of vehicle 1, the angular position of ramps 12 can be adjusted to more or less 20° of angle with respect to the position of each ramp 12 in extension of the box. When span 2 is used for crossing dry gaps in such a way as to form a fixed bridge, once ramps 12 are positioned in extension of their respective boxes 11, each cylinder 21 is immobilized in this position by a known complementary mechanical locking means, whereas in the floating ferry or bridge mode of this vehicle, each cylinder 21 is immobilized in the position for adjustment of ramp 12 in the range of more or less 20° of angle depending on the profile of the bank where the ramp is placed, quite simply by maintaining the pressure of the operating fluid in this cylinder.

The jacks housed in the driving structure of span 2 are operated hydraulically by an automatic connection embodied in this driving structure.

Span 2 of vehicle 1 functioning as a floating ferry can be connected end-to-end in a removable manner by a connecting means to another identical span of another vehicle functioning also as a floating ferry, in such a way as to form a longer floating bridge.

Preferably, this connecting means makes it possible to connect end-to-end the ends of the two deployed access ramps 12 of a given end of span 2 of the amphibious vehicle respectively to the ends of the two deployed access ramps 12 of a given end of span 2 of the other amphibious vehicle 1.

Figure 10:
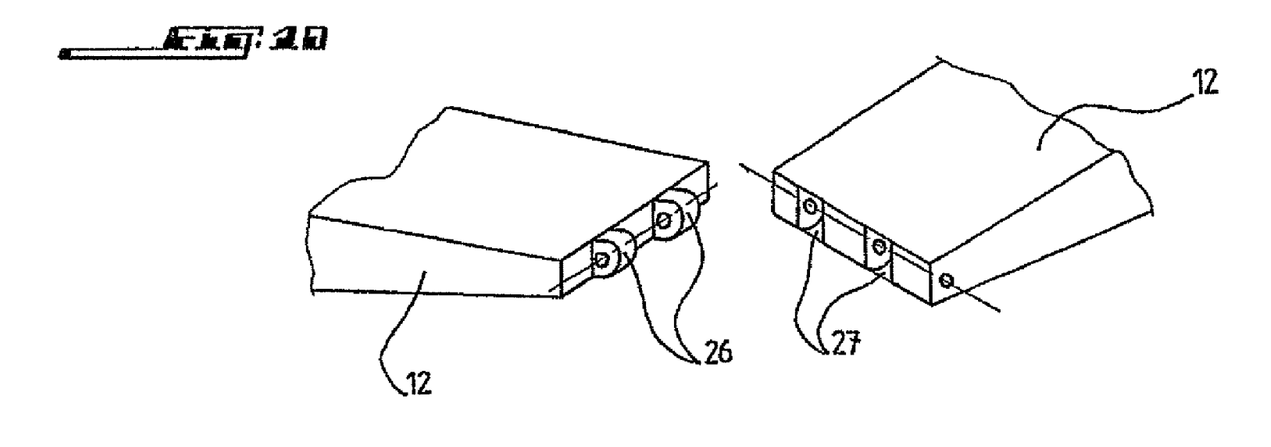
FIG. 10 is a partial view in perspective of the ends of two access ramps which can be coupled to one another in an articulated manner.
Figure 11:
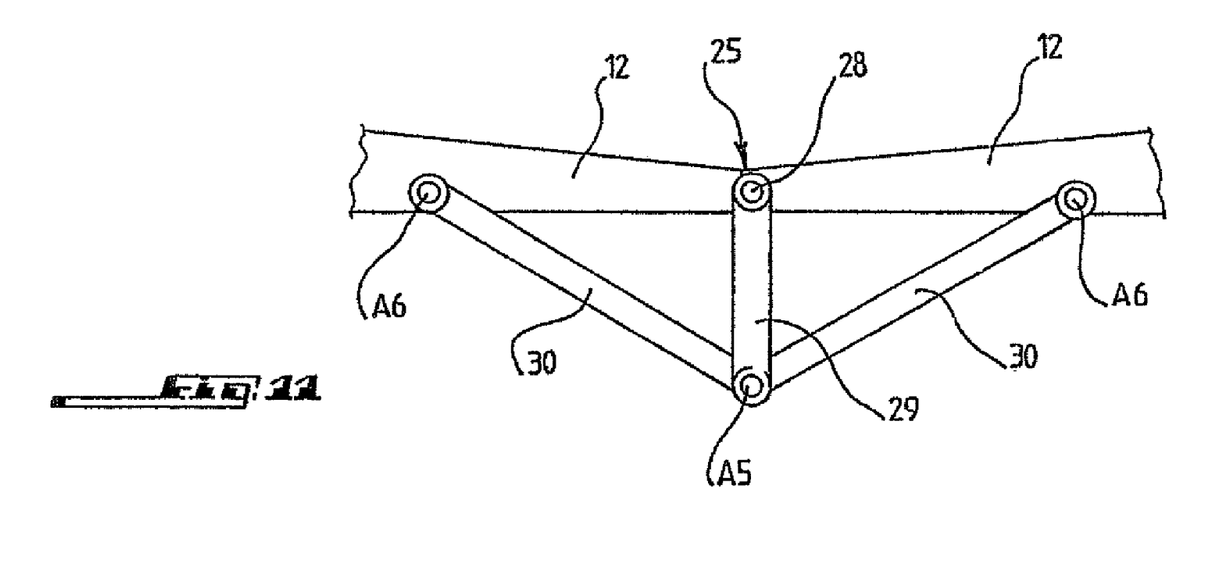
FIG. 11 is a side view representing the articulated connection of the ends of the two spans of FIG. 10 by a set of connecting rods.

For this purpose, as emerges more clearly from FIGS. 10 and 11, this connecting means comprises articulating hinge 25 of which knuckles 26 of the end of one of access ramps 12 of the vehicle 1 engage respectively in conjugate recesses 27 of the end of the other opposite access ramp 12 of the other vehicle. This means moreover comprises pin 28 passing through knuckles 26 and recesses 27 in order to assemble together the ends of the two ramps 12 facing one another of span 2, and two sets of connecting rods arranged on each side of the ramps put end-to-end and making it possible to absorb the bending moments. Each set of connecting rods has central connecting rod 29 connected to a corresponding end of pin 28 while extending below and roughly perpendicularly to ramps 12 when they are in extension of one another, and two lateral connecting rods 30 connected, on one hand, at A5 to the end of central connecting rod 29 on the opposite side from pin 28, and on the other hand, respectively to the corresponding sides of the two ramps 12 at A6. Pins 28 and connecting rods 29, 30 are positioned and locked manually, and the connection is symmetrical so as to allow locking of two spans end-to-end regardless of the end of the floating ferry or bridge that is presented.

As a variant, the connecting means can connect end-to-end the ends of the two access ramps of a given end of the span of the vehicle, which occupy their position folded over span 2, respectively to the ends of the two access ramps 12 of a given end of span 2 of the other amphibious vehicle, also occupying their position folded over this span. Such a connecting means is described in French Patent No. 2 666 772 in the name of the applicant.

According to another variant, the connecting means enables one to connect, by overlapping, the ends of the two deployed access ramps 12 of a given end of span 2 of the amphibious vehicle to the ends of the two deployed access ramps 12 of a given end of span 2 of the other amphibious vehicle as described in French Patent No. 2 683 837 in the name of the applicant.

Advantageously, the two ramps 12 of a given end of span 2 are provided with plate 31, visible in FIGS. 14B to 14I, which is arranged between the two ramps 12 and whose free end is raised in the manner of a ski. These ski plates 31 facilitate translation of span 2 in particular on an opposite bank on a lower level relative to the vehicle during laying of the span over dry gaps and enable one to rest the span on the two reinforced parts of the ends of access ramps 12. These ski plates can be attached in a removable manner to ramps 12 just before laying of the span over the dry gap, and in any case, they are arranged so as not to disturb the boarding of any vehicle on the span in bridge mode laid over the dry gap.

Figure 12:
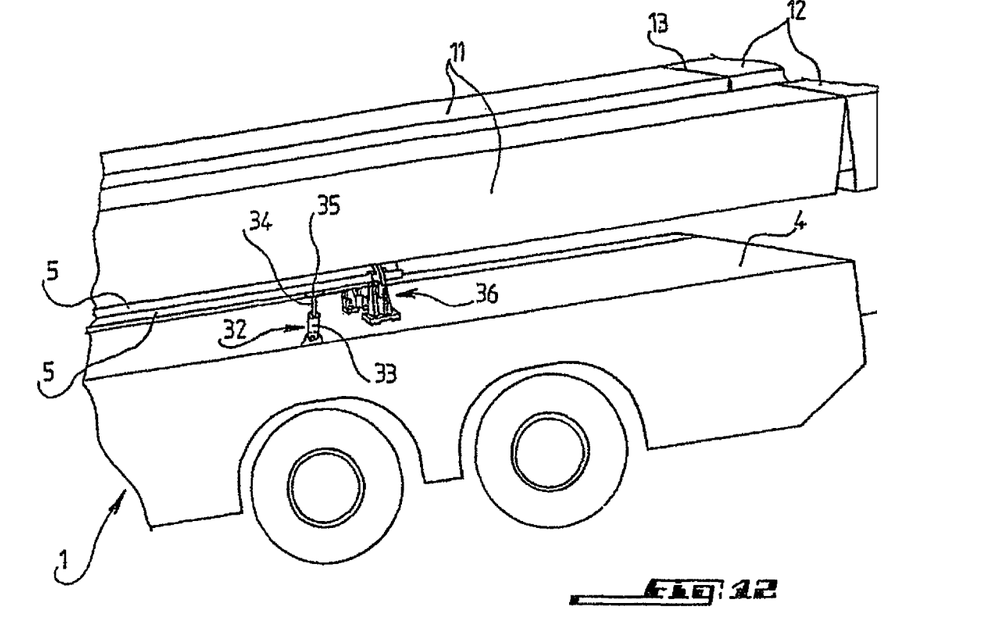
FIG. 12 is an enlarged view in perspective of the rear part of the amphibious vehicle of FIG. 1 and showing thrust and fastening means.

Vehicle 1 is also provided with cylinder 32, visible in FIG. 12, which is situated in the rear of the vehicle under beam 5 and makes it possible to absorb the forces, that is to say to distribute the loads between the front and the rear of the vehicle, loads which are connected with the assembly which includes launching beams 5, span 2 and vehicle VT transported on span 2 when the vehicle functions in floating ferry or bridge mode. To this effect, body 33 of cylinder 32 is attached to chassis 4 of the vehicle, extending roughly perpendicularly to the body, and rod 34 of cylinder 32 rests with the ability to slide, by plate 35 forming a pad which is connected with the end of rod 34, under beam 5. Furthermore, cylinder 32 can be operated so as to make beam 5 tilt around pivot pin 7 of tilting underframe 6 downward in order also to bring the end of access ramps 12 to rest on the corresponding edge of the gap to be crossed, in addition to the adjustment of the relative angular position of ramps 12 relative to boxes 11 by the assembly consisting of jacks 21 and connecting rods 22, in floating ferry or bridge mode of vehicle 1. This thus facilitates access by the rear of the amphibious vehicle in floating ferry or bridge mode by inclining span 2 downward in a simultaneous action with tilting underframe 6.

Figure 13:
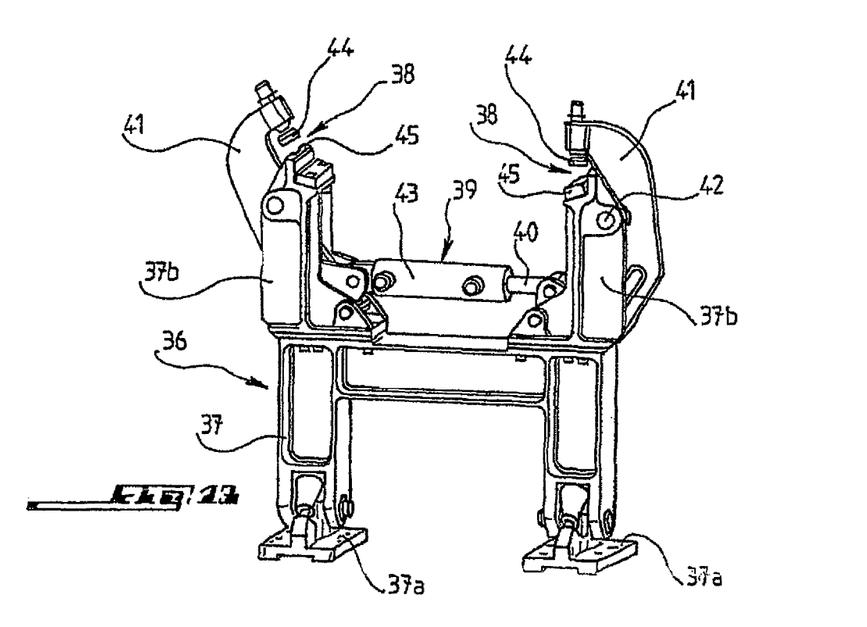
FIG. 13 is an enlarged view in perspective of the fastening means of FIG. 12.

Vehicle 1 can also be equipped with means 36 for fastening beam 5 to chassis 4 of the vehicle and which can be seen more clearly in FIG. 13.

This fastening means comprises rigid frame 37, generally H-shaped, whose lower feet 37a are connected with chassis 4, and two jaws 38 mounted, articulated to the upper end parts of two upper arms 37b of H-shaped frame 37 and which can be controlled by cylinder 39 arranged essentially transversely above the transverse limb of H-shaped frame 37, in such a way that each jaw 38 can be closed in order to squeeze a corresponding lower part of beam 5 which can consist of lower longitudinal rim 5a of beam 5.

Rod 40 of cylinder 39 is connected, articulated to the lower end of lever 41 mounted so as to pivot on one of arms 37b of frame 37 around horizontal pin 42, and its body 43 is connected, articulated to the lower end of second lever 41 mounted so as to pivot on the other opposite arm 37b of frame 37 around pin 42. The upper end of each lever 41 is curved and provided with jaw 44 which can come to face fixed jaw 45 connected with the upper end of the corresponding arm 37b of frame 37 in order to immobilize, in the manner of a vise, the corresponding rim part 5a of beam 5 which is therefore held rigidly on chassis 4 of the vehicle in transport mode.

Vehicle 1, in front, has stabilization foot 46 which occupies an inactive position stowed under the vehicle and which can be deployed to its active stabilization position resting on the ground during laying of span 2 over a dry gap, during which vehicle 1 rests on its axles.

The dimensions and weight of vehicle 1 equipped with its span and system for laying it are such that this assembly can be transported by any airplane capable of receiving accommodating vehicle 1.

Of course, vehicle 1 and its equipment can itself drive over a span in the form of a fixed bridge arranged over a dry gap or can be transported by another similar vehicle used in a floating ferry or bridge mode.

FIGS. 14A to 14I show the different steps for laying span 2 over a dry or wet gap, but whose length is somewhat less than the length of the span intended for forming a fixed bridge for crossing gap B, whose edge or bank on the opposite side from where vehicle 1 is situated is in this case at a lower level, with it understood that it can be at the same level or at a higher level.

The sequence for launching and laying of span 2 takes place as follows.

Figures 14A, 14B:
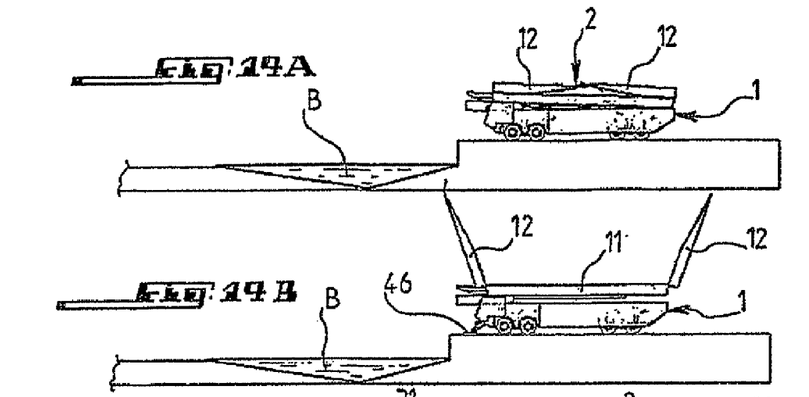
FIGS. 14A to 14I represent the different steps making it possible to lay a span over a dry or wet gap whose width is less than the width of the deployed span.

First of all, vehicle 1 equipped with its span 2 positions itself on the launching bank (FIG. 14A).

Figure 14C:
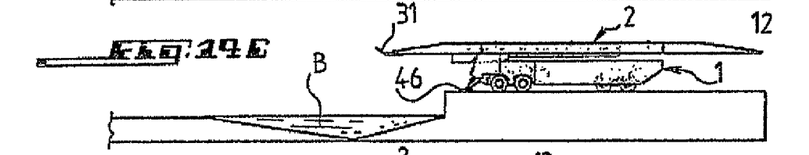

Then, stabilization foot 46 is deployed so as to rest on the ground in the vicinity of the bank of gap B, ramps 12 are deployed from their position folded over their respective boxes 11 (FIG. 14B) and are locked in horizontal position in extension of the driving structure consisting of boxes 11 (FIG. 14C).

Figures 14D, 14E, 14F:
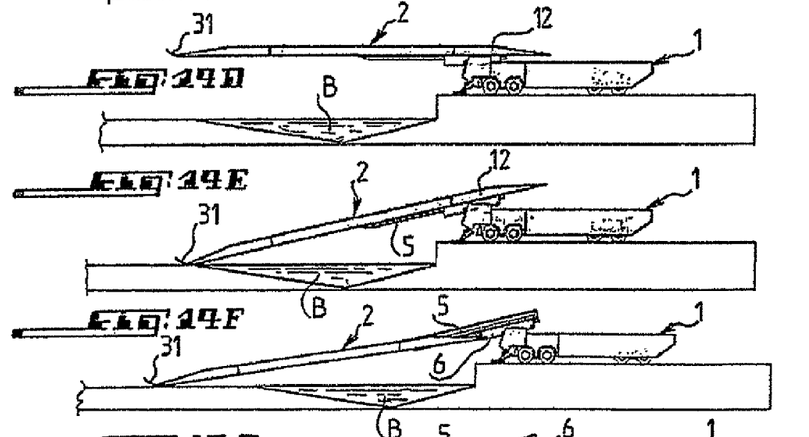

Span 2 is then moved by translation, on one hand, by beam 5 moving relative to vehicle 1, and on the other hand, by the means for moving span 2 relative to beam 5 to the position represented in FIG. 14D. Tilting underframe 6 is operated so as to tilt beam S and span 4 [sic] in such a way as to lay the end of ramp 12 on the opposite bank at a lower level (FIG. 14E), the translation of span 2 being facilitated by the use of plate 31 in the form of a ski.

Span 2 is then moved towards the front of the vehicle relative to beam 5 in order to hook rear connecting arm 15 at the end of beam 5 (FIG. 14F).

Figures 14G, 14H, 14I:
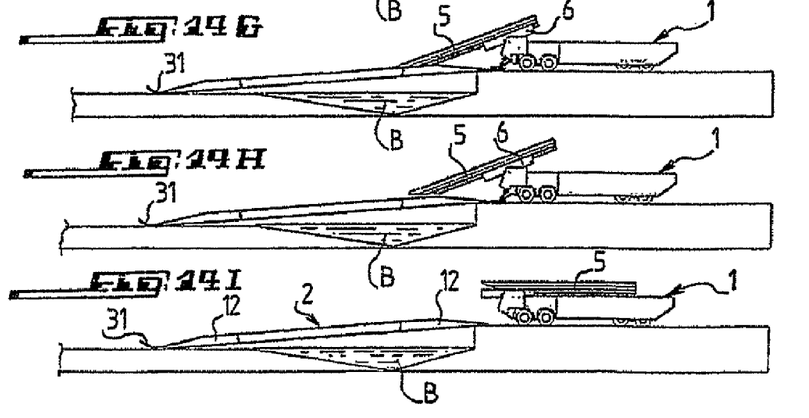

Tilting underframe 6 is operated so as to pivot again around its pin 17 and to lay the end of ramps 12 on the bank situated on the vehicle 1 side (FIG. 14G).

Launching beam 5 is then disengaged by rotation of tilting underframe 6 in the reverse direction around pin 7 and movement backward of beam 5 (FIG. 14H).

Finally, stabilization foot 46 is retracted in the front of vehicle 1, and the assembly consisting of beam 5 and titling underframe 6 is returned to its transport position on the chassis of the vehicle (FIG. 14I).

Thus, the vehicles can drive over span 2 in order to cross gap B, and vehicle 1 finally itself crosses the gap in order to retrieve span 2 on the opposite bank.

These different steps for laying and retrieving span 2 are already described in detail in the prior art consisting, for example, of French Patent No. 2 666 772 and French Patent No. 2 683 837 in the name of the applicant.

FIGS. 15A to 15J illustrate the different steps enabling vehicles VT to cross gap B filled with water from one bank to the other, and whose width is greater than the length of span 2 occupying its deployed position.

Figure 15A:
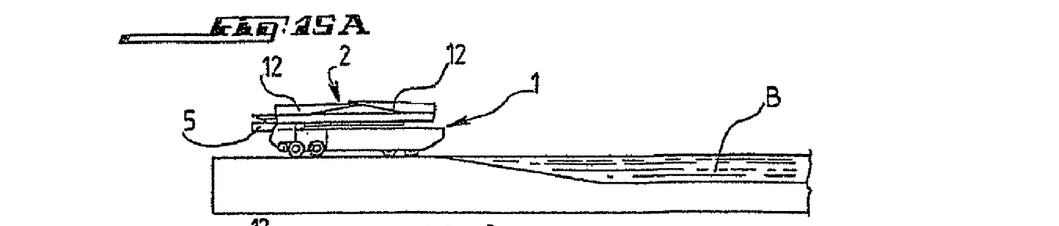
FIGS. 15A to 15J represent the different steps making it possible to cross very wide wet gaps.

As represented in FIG. 15A, vehicle 1 approaches the bank of gap B in reverse, but the vehicle can just as well approach these banks in forward.

Figure 15B:
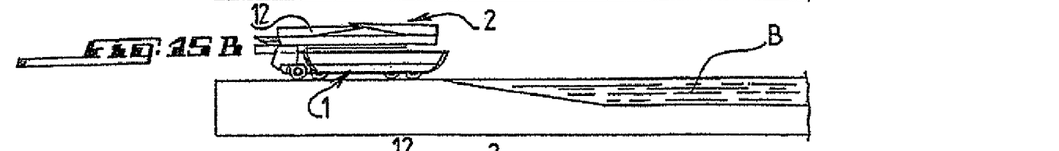

Inflatable lateral ballasts 19 are operated so that they are inflated and provide additional floatability and stability for the amphibious vehicle in the water (FIG. 15B).

Figures 15C, 15D:
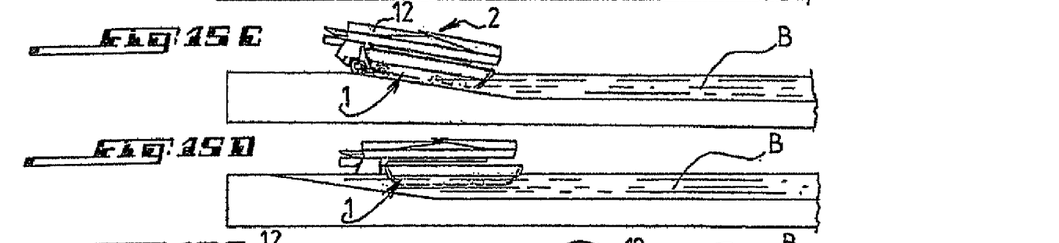

FIGS. 15C and 15D show that the amphibious vehicle forming a floating bridge has entered the water of gap B. It should be noted that from this stage, there are two operators who come out of the armored cab of vehicle 1, for example, through trap doors on the roof of the cab, and they board the pedestrian walkways arranged in the upper part of the ballasts as emerges more clearly from FIG. 3. These people then direct the following actions using an exterior control box.

Figures 15E, 15F:
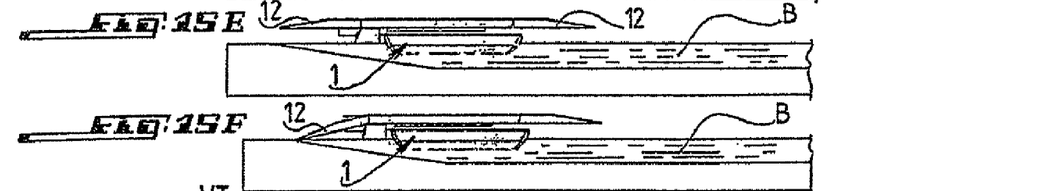

Thus, as shown by FIG. 15E, access ramps 12 are deployed so that they are arranged horizontally in the extension of the driving structure consisting of boxes 11.

The axles of floating vehicle 1 are raised by operation of its hydraulic suspensions, and access ramps 12 situated on the side of the bank where vehicle 1 is situated are oriented angularly relative to boxes 11 around their respective hinge pins 13 so as to come to rest on this bank situated at a lower level with respect to ramp 12 (FIG. 15F).

Figure 15G:
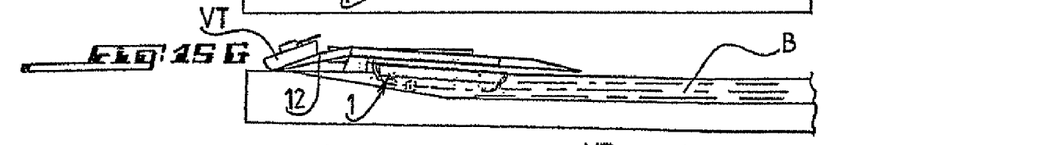
Figure 15H:
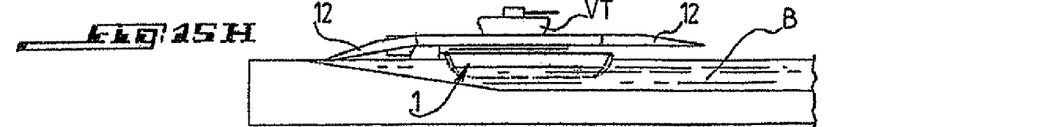
Figure 15I:
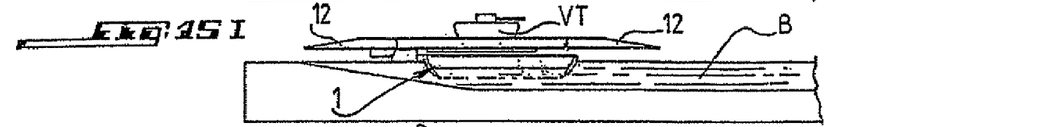
Figure 15J:
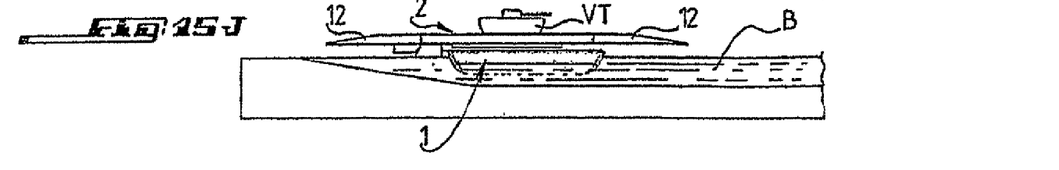

Vehicle VT to be transported can then board floating vehicle 1 by driving first over access ramps 12 and then over the driving structure until coming approximately to the middle of the latter (FIGS. 15G and 15H). At this stage, articulated ramps 12 are immobilized in position, and the whole pivots around the end support of these ramps on the bank, while keeping a regulation freeboard distance, thanks to the additional floatability provided by inflatable ballasts 19.

The length of the ramps makes it possible to have a sufficient water level without risking grounding, even once vehicle VT has boarded.

Once vehicle VT is on board in the middle of the floating bridge, boarding ramp 12 is raised to its horizontal position (FIG. 15I), and amphibious vehicle 1 crosses gap B (FIG. 15J) so that ramps 12 on the opposite side of 2 can be laid in the direction of the opposite bank, and transported vehicle VT can land with orientation of the corresponding ramps 12 so that they come to rest on the bank, ramps which are returned to their horizontal position once vehicle VT has landed.

Figure 1:
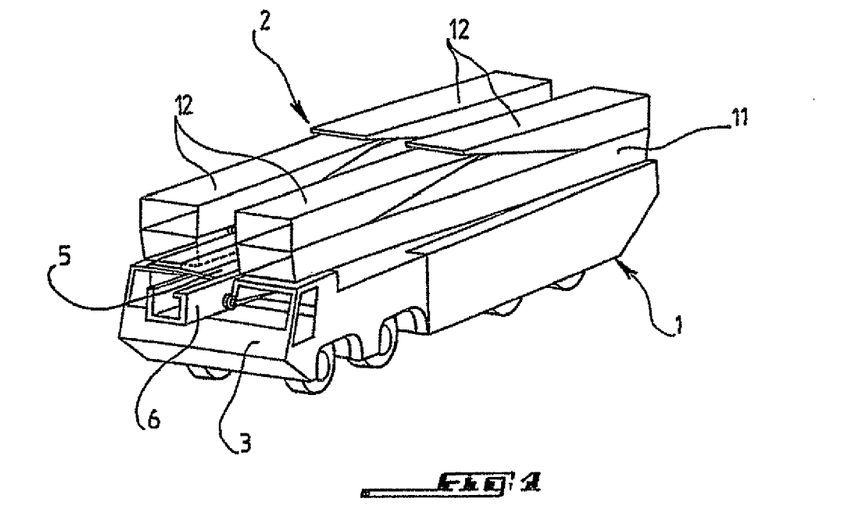
FIG. 1 is a view in perspective of an amphibious road vehicle of the invention carrying a span making it possible to cross a dry gap or a wet gap.
Figure 2:
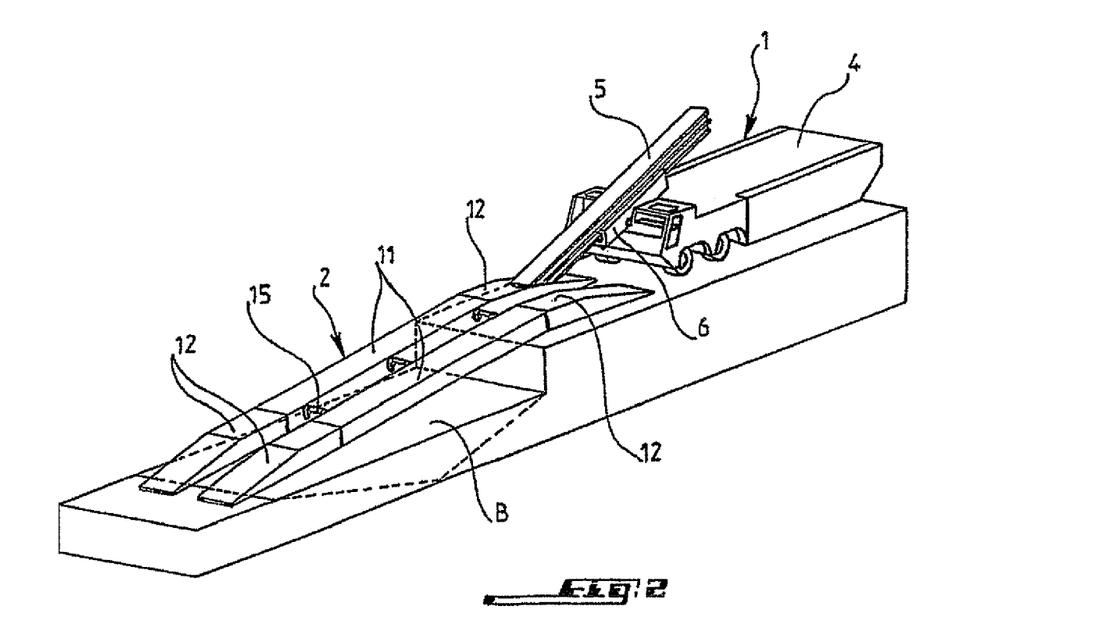
FIG. 2 is a view in perspective of the vehicle of FIG. 1 provided with its system making it possible to lay the span over a dry gap.
Figure 3:
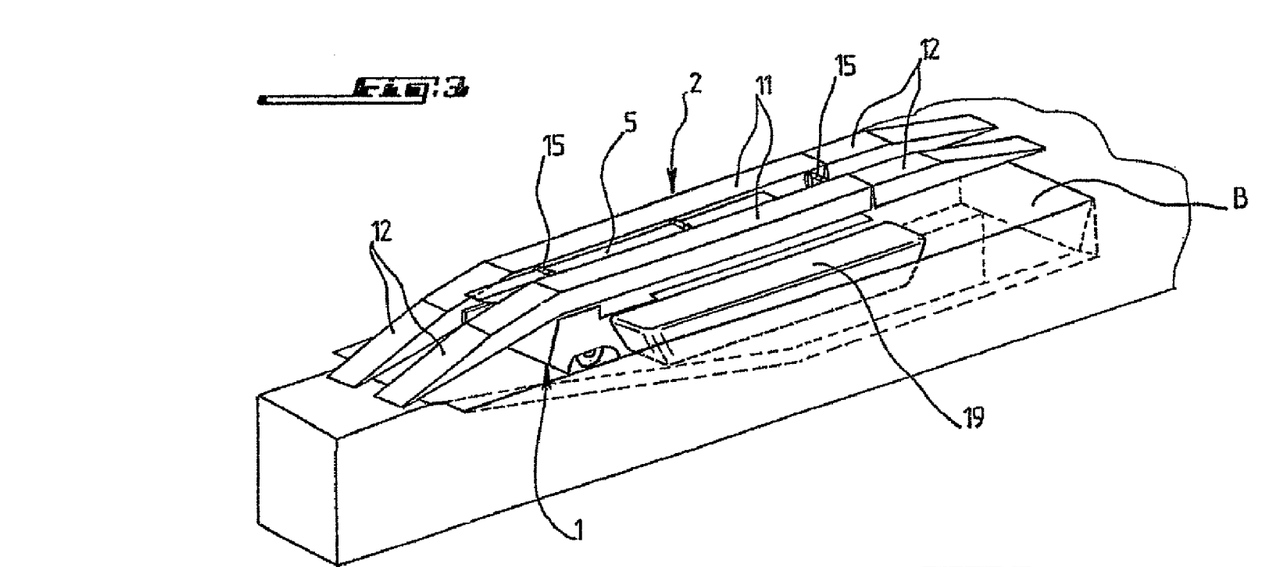
FIG. 3 is a view in perspective of the vehicle of FIG. 1 used as a floating ferry for crossing a wet gap.
Figure 4:
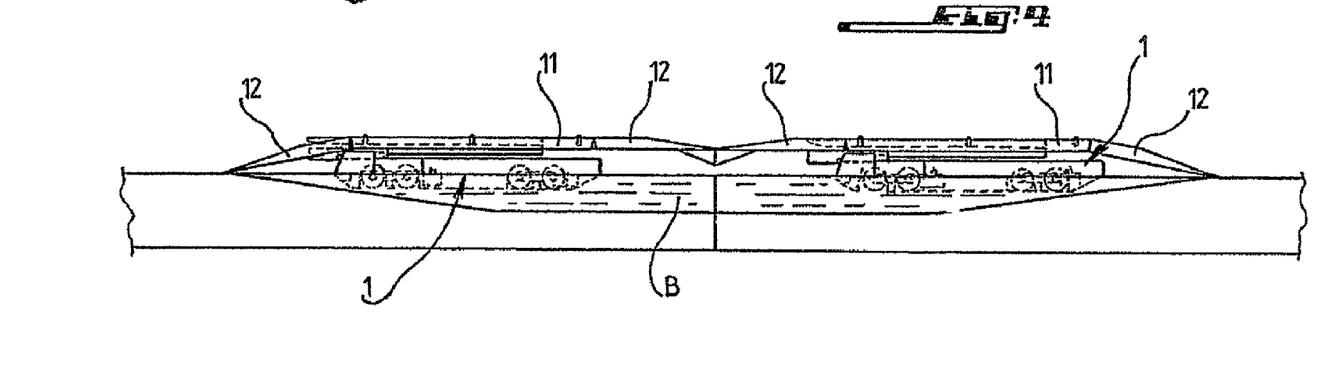
FIG. 4 is a side view representing two amphibious vehicles of FIG. 1 whose spans are joined end-to-end in order to form a longer floating ferry, making it possible to cross corresponding wet gaps.
Figures 4, 5:
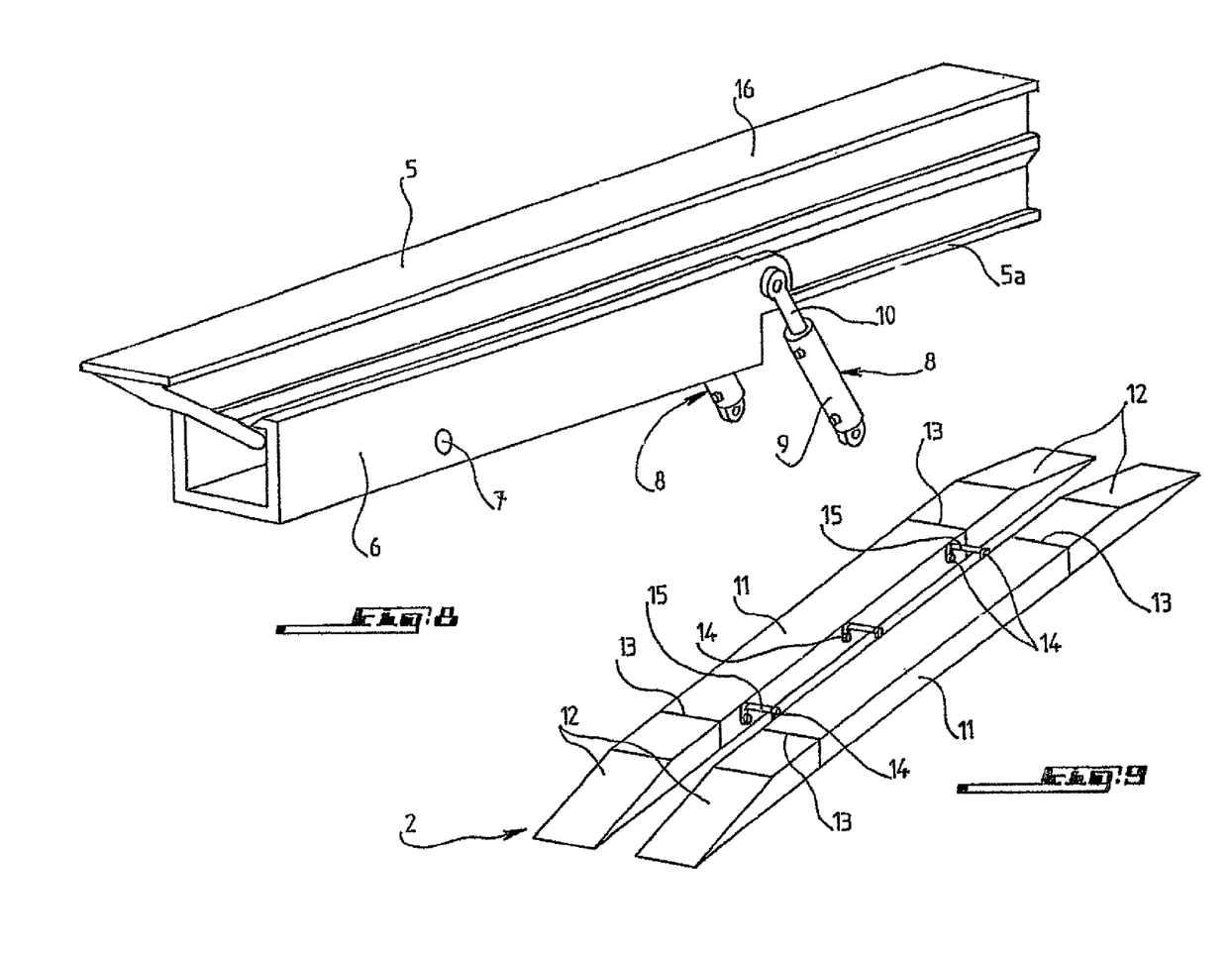
FIG. 5 is a bottom view of the amphibious vehicle of FIG. 1.
Figure 5:
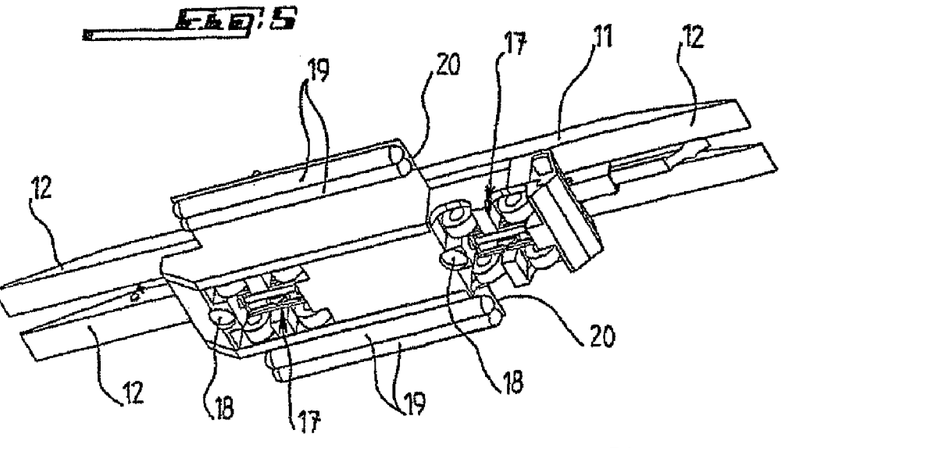
Figure 6:
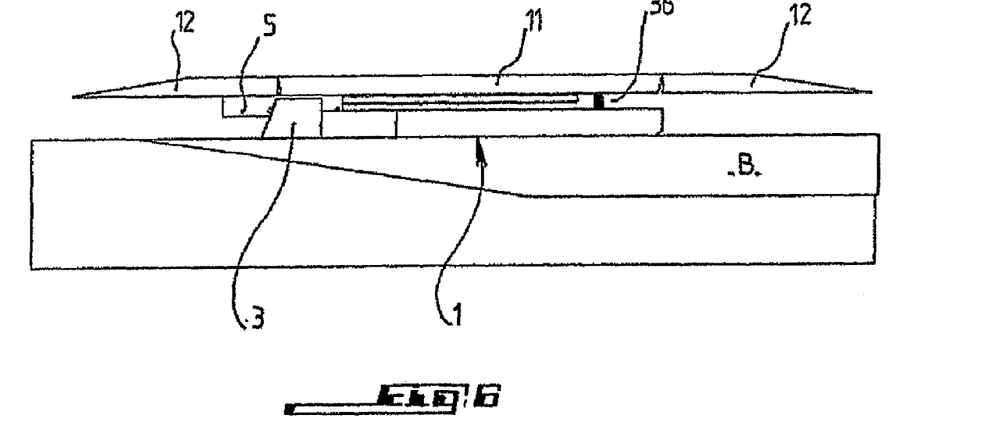
FIG. 6 is a side view of the amphibious vehicle functioning as floating ferry.

If necessary, two similar amphibious vehicles 1 can be used for putting two spans 2 end-to-end and thus forming a floating bridge which is long enough to cover the whole width of a gap filled with water as represented in FIG. 4.

Of course, it is possible to assemble as many amphibious vehicles as are necessary for covering any width of wet gap B.

The invention claimed is:

1. A bridge span and bridge span transportation vehicle comprising:
    an amphibious vehicle which may traverse dry land and water;
    a span comprising two parallel boxes, each box having a parallelepiped shape, respective ends, pins, a track, and two ramps, the ramps, when in operative positions, providing access to the ends of the respective track, the ramps being respectively articulated to the ends of the box by respective pins, for pivoting of each ramp from an inactive position, folded over the respective box, to the operative position, extending from the respective box;
    a transporting and positioning apparatus mounted on the amphibious vehicle for supporting and positioning the span, the span extending longitudinally with respect to the amphibious vehicle when the span is supported by the transporting and positioning apparatus,
        the transporting and positioning apparatus transporting the span so that the span is resting on the transporting and positioning apparatus on the amphibious vehicle when the amphibious vehicle is floating in water in a depression containing water, the depression being confined by opposing banks, with at least some of the ramps contacting at least one of the banks and varying in angular position relative to the respective box by rotating about the respective pin, so that a dry road vehicle may cross the depression containing water by entering, being supported by, and exiting the span, while the span is resting on the amphibious vehicle and the amphibious vehicle is floating in the water, and
        the transporting and positioning apparatus positioning the span at a location separated from the amphibious vehicle so that the ramps are positioned on banks on opposite sides of and defining a depression that may be dry or may contain water, with the banks supporting the ramps and the span, the ramps being in fixed angular positions relative to the respective boxes so that the dry road vehicle may cross the depression by traversing the ramps and the span.

2. The bridge span and bridge span transportation vehicle according to claim 1, wherein the amphibious vehicle includes at least one inflatable lateral ballast for buoyancy and stability of the amphibious vehicle.

3. The bridge span and bridge span transportation vehicle according to claim 1, wherein the amphibious vehicle includes a hydraulic suspension for raising axles of the amphibious vehicle, and a turbine device for aquatic propulsion of the amphibious vehicle.

4. The bridge span and bridge span transportation vehicle according to claim 1, wherein each ramp comprises an actuating cylinder having a piston and mounted in the respective box of the span, and two connecting rods having respective first ends articulated together at the piston of the cylinder and respective second ends articulated, respectively to an inner surface of an upper track wall of the respective box and to an inner surface of a lower wall of the respective box.

5. The bridge span and bridge span transportation vehicle according to claim 1, wherein the span includes connecting means for connecting, end-to-end, the span to a second span of a second amphibious vehicle to form a longer bridge.

6. The bridge span and bridge span transportation vehicle according to claim 5, wherein the connecting means connects, end-to-end, ends of two ramps of the span of the amphibious vehicle to respective ends of two ramps of the second amphibious vehicle.

7. The bridge span and bridge span transportation vehicle according to claim 6, wherein the connecting means comprises
    an articulating hinge including knuckles at an end of one of the ramps, the knuckles engaging, respectively, conjugate recesses of an opposite ramp, and including a connecting pin passing through the recesses and the knuckles, and
    sets of connecting rods arranged on each side of the ramps that are placed end-to-end, the sets of connecting rods including
        a central connecting rod connected to a corresponding end of the connecting pin and extending below the ramps, and
        two lateral connecting rods connected to the end of the central connecting rod on an opposite side from the connecting pin, and, respectively, to corresponding sides of the ramps.

8. The bridge span and bridge span transportation vehicle according to claim 6, wherein the connecting means connecting, end-to-end, the ends of two ramps of the span of the amphibious vehicle, respectively, to the ends of the two ramps of the second amphibious vehicle, are foldable over the span.

9. The bridge span and bridge span transportation vehicle according to claim 6, wherein the connecting means connects, by overlapping, the ends of the two ramps at an end of the span of the amphibious vehicle to the ends of the two ramps of the second amphibious vehicle.

10. The bridge span and bridge span transportation vehicle according to claim 1, wherein the two ramps at an end of the span include a plate located between the two ramps and having a free end raised as a ski.

11. The bridge span and bridge span transportation vehicle according to claim 1, wherein the amphibious vehicle includes a stabilization foot which can rest on the ground during laying of the span over the depression.

12. The bridge span transportation vehicle according to claim 1, wherein the transporting and positioning apparatus comprises:
    a beam for supporting, launching, and positioning the span at a position separated from the amphibious vehicle, and
    an underframe, wherein
        the beam is located longitudinally with respect to the amphibious vehicle,
        the beam is movable longitudinally relative to the amphibious vehicle between an inactive position, resting on the amphibious vehicle, and a launching position, projecting from the amphibious vehicle, the beam moves the span by translation, with the span guided by the beam, to a position projecting from the beam, the beam is supported by the underframe, and the underframe is orientable and translatable, and tilts around a pivot pin, so the beam pivots the span, first, to rest a projecting, first end of the span on the bank of the depression opposite from the bank where the amphibious vehicle is located, second, to rest a second end of the span on the bank where the amphibious vehicle is located, and third, to disengage the beam from the span.

13. The bridge span and bridge span transportation vehicle according to claim 12, including at least one thrust cylinder situated on the amphibious vehicle, under the beam, and having
a body attached to the amphibious vehicle, and
a rod slidably located under the beam, the thrust cylinder tilting the beam, around the pivot pin to bring an end of the span to rest on a bank of the depression.

14. The bridge span and bridge span transportation vehicle according to claim 12, comprising means for fastening the beam to a chassis of the amphibious vehicle, the means for fastening including
a control cylinder,
a rigid frame connected perpendicularly to the chassis and on which the control cylinder is mounted, and
two jaws articulated to the rigid frame and controlled by the control cylinder so that each jaw can grip a corresponding part of the beam.

15. The bridge span and bridge span transportation vehicle according to claim 12, wherein each ramp comprises an actuating cylinder having a piston and mounted in the respective box of the span, and two connecting rods having respective first ends articulated together at the piston of the cylinder and respective second ends articulated, respectively to an inner surface of an upper track wall of the respective box and to an inner surface of a lower wall of the respective box.

16. The bridge span and bridge span transportation vehicle according to claim 12, wherein the span includes connecting means for connecting, end-to-end, the span to a second span of a second amphibious vehicle to form a longer bridge.

17. The bridge span and bridge span transportation vehicle according to claim 16, wherein the connecting means connects, end-to-end, ends of two ramps of the span of the amphibious vehicle to respective ends of two ramps of the second amphibious vehicle.

18. The bridge span and bridge span transportation vehicle according to claim 17, wherein the connecting means comprises
an articulating hinge including knuckles at an end of one of the, the knuckles engaging, respectively, conjugate recesses of an opposite ramp, and including a connecting pin passing through the recesses and the knuckles, and
sets of connecting rods arranged on each side of the ramps that are placed end-to-end, the sets of connecting rods including
a central connecting rod connected to a corresponding end of the connecting pin and extending below the ramps, and
two lateral connecting rods connected to the end of the central connecting rod on an opposite side from the connecting pin, and, respectively, to corresponding sides of the ramps.

19. The bridge span and bridge span transportation vehicle according to claim 17, wherein the connecting means connecting, end-to-end, the ends of two ramps of the span of the amphibious vehicle, respectively, to the ends of the two ramps of the second amphibious vehicle, are foldable over the span.

20. The bridge span and bridge span transportation vehicle according to claim 17, wherein the connecting means connects, by overlapping, the ends of the two ramps at an end of the span of the amphibious vehicle to the ends of the two ramps of the second amphibious vehicle.

* * * * *